US012567014B2

(12) United States Patent
Li et al.

(10) Patent No.: US 12,567,014 B2
(45) Date of Patent: Mar. 3, 2026

(54) PATRON PRESENCE BASED WORKFORCE CAPACITY NOTIFICATION

(71) Applicant: International Business Machines Corporation, Armonk, NY (US)

(72) Inventors: Jialin Li, Westford, MA (US); Pradeep K. Nanjundaswamy, Bangalore (IN); Srikanth Sundararajan, Cambridge, MA (US); Danai Tengtrakool, Burlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1475 days.

(21) Appl. No.: 15/471,054

(22) Filed: Mar. 28, 2017

(65) Prior Publication Data

US 2018/0285793 A1    Oct. 4, 2018

(51) Int. Cl.
　G06Q 10/0631　　(2023.01)
　G06Q 10/0633　　(2023.01)
　G06Q 30/02　　(2023.01)

(52) U.S. Cl.
　CPC ... G06Q 10/0633 (2013.01); G06Q 10/06311 (2013.01); G06Q 30/0281 (2013.01)

(58) Field of Classification Search
　CPC ........... G06Q 10/0633; G06Q 10/0631; G06Q 10/06311; G06Q 30/0281; G06N 7/005
　USPC ...................................................... 705/7.27
　See application file for complete search history.

(56) References Cited

U.S. PATENT DOCUMENTS

| | | | | |
|---|---|---|---|---|
| 5,390,107 A * | 2/1995 | Nelson | ............. | G06Q 10/06311 705/7.13 |
| 5,557,513 A * | 9/1996 | Frey | ................... | G06Q 10/0631 705/7.12 |
| 7,962,361 B2 * | 6/2011 | Ramchandani | .... | G06Q 30/0255 705/14.58 |
| 8,280,763 B2 * | 10/2012 | Connell, II | ........ | G06Q 30/0242 705/14.1 |
| 2003/0132298 A1 * | 7/2003 | Swartz | ............... | G06Q 20/3276 235/472.02 |
| 2003/0144971 A1 * | 7/2003 | Das | ........................ | G06Q 20/10 705/401 |
| 2007/0100677 A1 * | 5/2007 | Boss | ................ | G06Q 10/06311 705/7.13 |
| 2008/0209431 A1 * | 8/2008 | La Vecchia | .... | G06Q 10/063112 718/104 |

(Continued)

*Primary Examiner* — Renae Feacher

(74) *Attorney, Agent, or Firm* — Elliot J. Shine, Esq.; Heslin Rothenberg Farley & Mesiti P.C.; George S. Blasiak, Esq.

(57)　　　　ABSTRACT

Methods, computer program products, and systems are presented. The method computer program products, and systems can include, for instance: obtaining information specifying a count of patrons currently at a venue and determining a probability that at least one patron included in the count of patrons will perform at least a portion of a venue work task; establishing a workload capacity requirement for maintaining operation of the venue, the establishing based on the count of patrons and the probability that the at least one patron included in the count of patrons will perform at least a portion of the venue work task; and sending notifications to a plurality of computer devices in the venue based on the establishing.

15 Claims, 7 Drawing Sheets

(56)          References Cited

U.S. PATENT DOCUMENTS

| 2009/0076922 | A1* | 3/2009 | de Gruil | G06Q 20/20 |
| | | | | 705/16 |
| 2009/0106124 | A1* | 4/2009 | Yang | G06Q 30/0601 |
| | | | | 705/26.1 |
| 2009/0271788 | A1* | 10/2009 | Holt | G06Q 10/06 |
| | | | | 718/100 |
| 2010/0262476 | A1* | 10/2010 | Amour | G07F 17/3258 |
| | | | | 705/14.14 |
| 2012/0078675 | A1 | 3/2012 | McNeill et al. | |
| 2013/0103442 | A1* | 4/2013 | Burks | G06Q 10/06311 |
| | | | | 705/7.13 |
| 2013/0103452 | A1* | 4/2013 | Burks | G06Q 50/12 |
| | | | | 705/7.25 |
| 2013/0110281 | A1* | 5/2013 | Jones | G05D 1/00 |
| | | | | 700/228 |
| 2013/0262174 | A1* | 10/2013 | Singh | G06Q 10/06 |
| | | | | 705/7.25 |
| 2014/0019294 | A1* | 1/2014 | Hill | G06Q 30/06 |
| | | | | 705/26.7 |
| 2014/0172477 | A1* | 6/2014 | Goulart | G06Q 10/06311 |
| | | | | 705/7.13 |
| 2015/0006213 | A1 | 1/2015 | Heier | |
| 2015/0235161 | A1 | 8/2015 | Azar et al. | |
| 2015/0262158 | A1 | 9/2015 | Rasband et al. | |
| 2015/0346963 | A1* | 12/2015 | Spear | G06Q 10/06 |
| | | | | 715/733 |
| 2016/0110799 | A1* | 4/2016 | Herring | G06F 18/24 |
| | | | | 705/26.81 |
| 2016/0162910 | A1* | 6/2016 | Pradhan | G06Q 30/0201 |
| | | | | 705/7.23 |
| 2017/0024805 | A1* | 1/2017 | Tepfenhart, Jr. | G06Q 10/0836 |
| 2017/0323211 | A1* | 11/2017 | Bencke | G06Q 10/00 |
| 2018/0053401 | A1* | 2/2018 | Martin | H04M 11/04 |
| 2018/0096297 | A1* | 4/2018 | Ghatage | G06Q 10/0833 |
| 2018/0174189 | A1* | 6/2018 | Joseph | H04W 4/21 |

* cited by examiner

Figure 3:
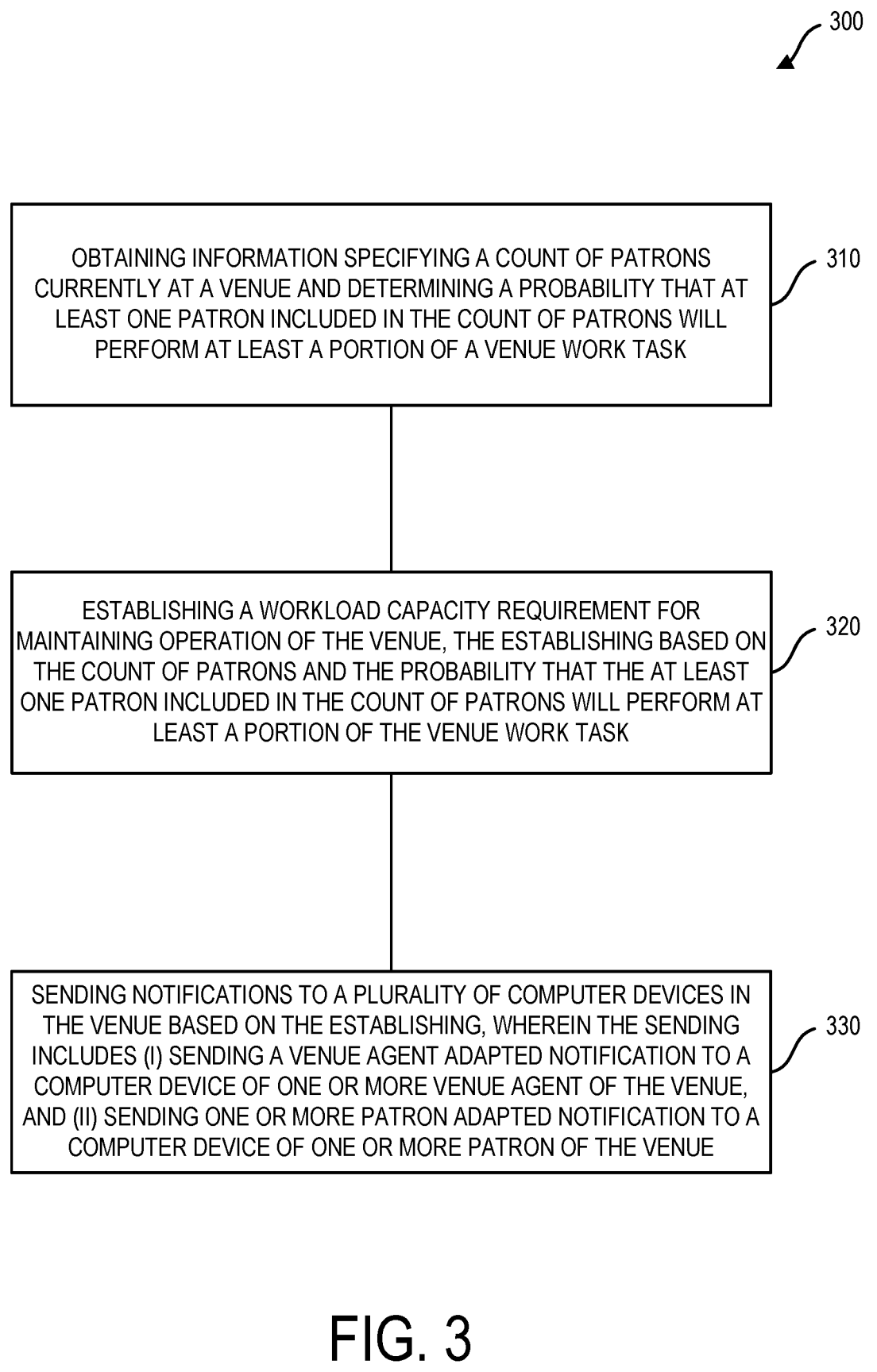

300

OBTAINING INFORMATION SPECIFYING A COUNT OF PATRONS CURRENTLY AT A VENUE AND DETERMINING A PROBABILITY THAT AT LEAST ONE PATRON INCLUDED IN THE COUNT OF PATRONS WILL PERFORM AT LEAST A PORTION OF A VENUE WORK TASK

310

ESTABLISHING A WORKLOAD CAPACITY REQUIREMENT FOR MAINTAINING OPERATION OF THE VENUE, THE ESTABLISHING BASED ON THE COUNT OF PATRONS AND THE PROBABILITY THAT THE AT LEAST ONE PATRON INCLUDED IN THE COUNT OF PATRONS WILL PERFORM AT LEAST A PORTION OF THE VENUE WORK TASK

320

SENDING NOTIFICATIONS TO A PLURALITY OF COMPUTER DEVICES IN THE VENUE BASED ON THE ESTABLISHING, WHEREIN THE SENDING INCLUDES (I) SENDING A VENUE AGENT ADAPTED NOTIFICATION TO A COMPUTER DEVICE OF ONE OR MORE VENUE AGENT OF THE VENUE, AND (II) SENDING ONE OR MORE PATRON ADAPTED NOTIFICATION TO A COMPUTER DEVICE OF ONE OR MORE PATRON OF THE VENUE

PATRON PRESENCE BASED WORKFORCE CAPACITY NOTIFICATION

BACKGROUND

With traditional retail venue shopping experiences, a patron selects items at the store by placing them in a shopping cart. The patron moves around the store with the items selected while looking for other items that they also may purchase. When the patron is ready to purchase the selected items, the patron moves to a location of a point of sale terminal. The patron then purchases the items at this point of sale terminal.

In some cases, a patron may wish to purchase more items than can reasonably be purchased using a traditional retail shopping experience at a brick and mortar store. For example, a patron may desire to purchase more items than can be carried in a shopping cart in the store. As another example, the patron may not have sufficient room at home to store items that are purchased from the store.

Retail venues, on occasion, offer patrons discounted prices for bulk purchases. Bulk purchasing benefits both the retailer, who makes more sales, and the patron who gets a discounted price. However, patrons placing a limited number of items of a particular type in their shopping cart may not be aware of a bulk price offer for the item. Additionally, even if the patron is aware of the bulk price, the patron may choose to ignore the bulk price offer due to limited storage, product expiration dates, and other factors.

One current approach to improving the retail venue shopping experience includes having retail venue clerks offer shipping to patrons for large and heavy items. These items may be, for example, furniture and appliances. This approach is limited in a number of ways. For example, a sufficient count of retail venue clerks may not be available to do the work of setting up the shipping of the items. As another example, the additional time spent by store clerks setting up the shipping of the items may be undesirable when compared to time the store clerks spend on other tasks.

Another approach to improving the retail venue shopping experience includes having a patron purchase an item for pickup at the retail venue. For example, when a large or expensive item is selected, a patron may be directed by the store to pick up the item at a specified location of the store. For example, the patron may be directed to pickup and purchase an item at a patron service desk at the retail venue. As another example, the patron may be directed to collect the item, after purchase, at a location of the store suited for pickup of large items. In some cases, selecting items to purchase may be limited to in venue pickup at the time of purchase.

SUMMARY

Shortcomings of the prior art are overcome, and additional advantages are provided, through the provision, in one aspect, of a method. The method can include, for example: obtaining information specifying a count of patrons currently at a venue and determining a probability that at least one patron included in the count of patrons will perform at least a portion of a venue work task; establishing a workload capacity requirement for maintaining operation of the venue, the establishing based on the count of patrons and the probability that the at least one patron included in the count of patrons will perform at least a portion of the venue work task; and sending notifications to a plurality of computer devices in the venue based on the establishing, wherein the sending includes (i) sending a venue agent adapted notification to a computer device of one or more venue agent of the venue, and (ii) sending one or more patron adapted notification to a computer device of one or more patron of the venue.

In another aspect, a computer program product can be provided. The computer program product can include a computer readable storage medium readable by one or more processing unit and storing instructions for execution by one or more processor for performing a method. The method can include, for example: obtaining information specifying a count of patrons currently at a venue and determining a probability that at least one patron included in the count of patrons will perform at least a portion of a venue work task; establishing a workload capacity requirement for maintaining operation of the venue, the establishing based on the count of patrons and the probability that the at least one patron included in the count of patrons will perform at least a portion of the venue work task; and sending notifications to a plurality of computer devices in the venue based on the establishing, wherein the sending includes (i) sending a venue agent adapted notification to a computer device of one or more venue agent of the venue, and (ii) sending one or more patron adapted notification to a computer device of one or more patron of the venue.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining information specifying a count of patrons currently at a venue and determining a probability that at least one patron included in the count of patrons will perform at least a portion of a venue work task; establishing a workload capacity requirement for maintaining operation of the venue, the establishing based on the count of patrons and the probability that the at least one patron included in the count of patrons will perform at least a portion of the venue work task; and sending notifications to a plurality of computer devices in the venue based on the establishing, wherein the sending includes (i) sending a venue agent adapted notification to a computer device of one or more venue agent of the venue, and (ii) sending one or more patron adapted notification to a computer device of one or more patron of the venue.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3 depicts a flowchart illustrating a method for providing a notification according to one embodiment;

DETAILED DESCRIPTION

Figure 1:
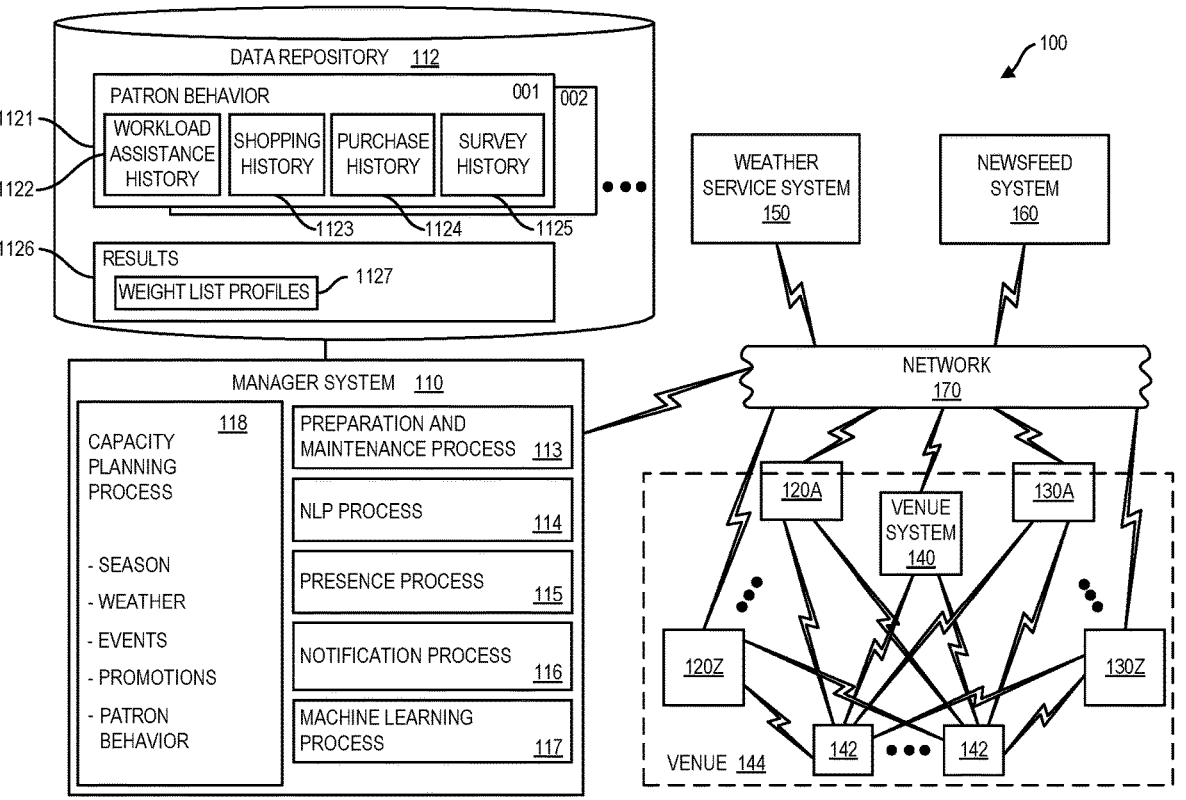
FIG. 1 depicts a system having manager system and a data repository according to one embodiment.

One embodiment of system 100 as set forth herein is shown in FIG. 1. FIG. 1 is a block diagram of a system 100, in accordance with an embodiment as set forth herein. System 100 can include a manager system 110 having an associated data repository 112, a plurality of venue agent user computer devices 120A-120Z, a plurality of patron user computer devices 130A-130Z, a venue system 140 have associated wireless communication connection devices 142 disposed in retail venue 144, a weather service system 150, and a newsfeed system 160. Of the various systems and devices in communication with one another via network 170. Manager system 110, venue system 140, weather service system 150, and a newsfeed system 160 venue agent user computer devices 120A-120Z, patron user computer devices 130A-130Z can be computing node based systems and devices as set forth herein connected by a network 170. For example, network 170 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

Each of the different venue agent user computer devices 120A-120Z, and patron user computer devices 130A-130Z can be associated to a different user. In one embodiment manager system 110 can be external to venue system 140 and to each of the one or more user computer device 120A-120Z, 130A-130Z. In one embodiment manager system 110 can be co-located with venue system 140. In one embodiment manager system 110 can be co-located with one or more user computer device 120A-120Z, 130A-130Z. Manager system 110 in one embodiment can be operated by a common organizational entity that operates venue system 140, wireless communication connection devices 142, venue and one or more venue agent user computer devices 120A-120Z.

Regarding one or more user computer device 120A-120Z, 130A-130Z, a computer device of one or more user computer device 120A, 120Z, 130A-130Z in one embodiment can be a computing node based device provided by a client computer, e.g. a mobile device, e.g. a smartphone or tablet, a laptop or PC that runs one or more program including a web browser for browsing web pages.

Manager system 110 can be operative to run for example a preparation and maintenance process 113, a natural language processing (NLP process) 114, a presence process 115, a notification process 116, a machine learning process 117, and a capacity planning process 118.

Figure 2:
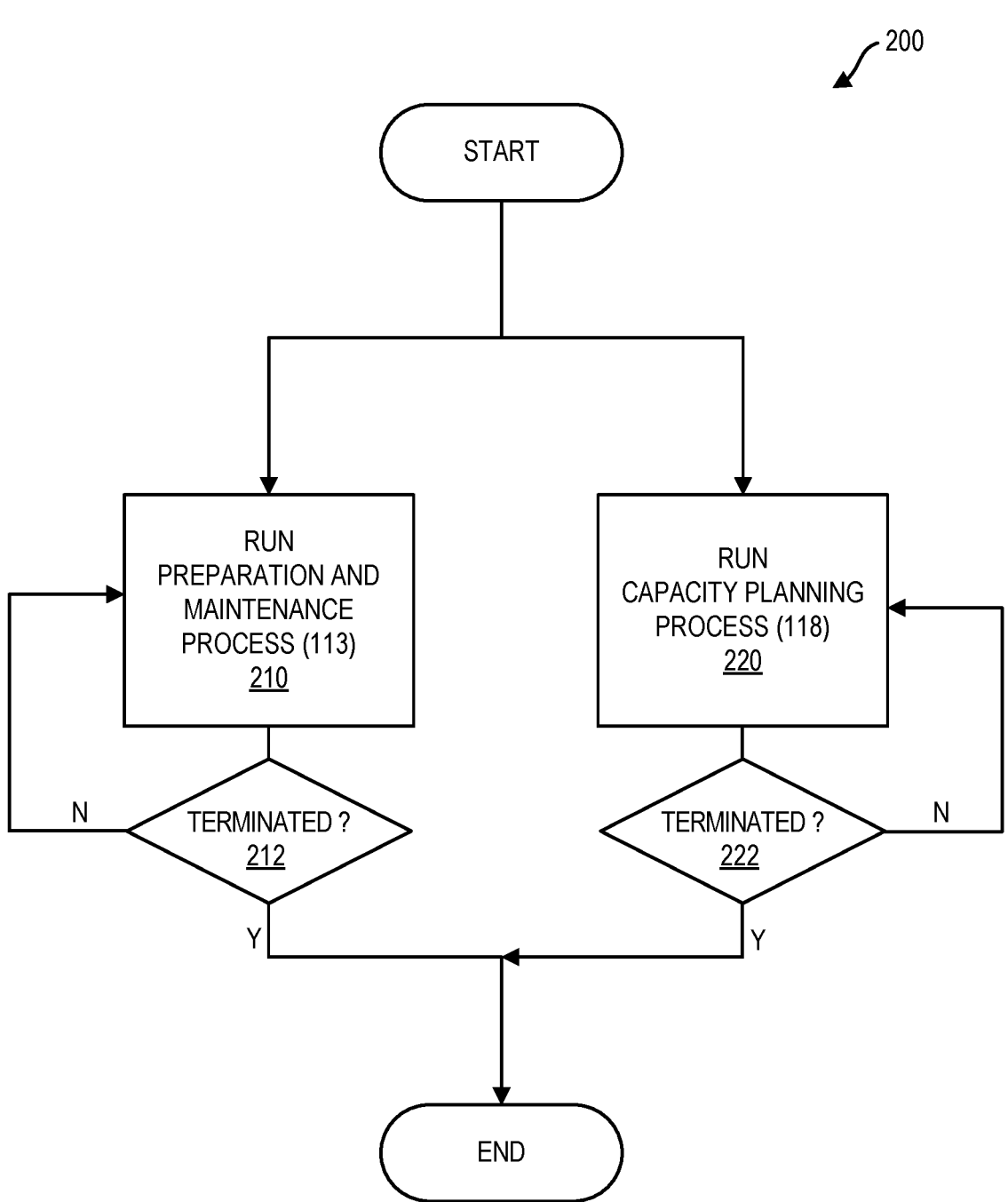
FIG. 2 depicts a flowchart illustrating coordination of processes according to one embodiment.

FIG. 2 depicts a flowchart of illustrating coordination of processes that can be performed by manager system 110 of FIG. 1, in accordance with one or more embodiments set forth herein.

At block 210, manager system 110 can run preparation and maintenance process 113 to populate prepare and maintain various data of data repository 112 including data of workload assistance history area 1122 shopping history area 1123 purchase history area 1124 and survey history area 1125. Manager system 110 can run preparation and maintenance process 113 until process 113 is terminated at block 212.

At block 220, manager system 110 can run capacity planning process 118 to determine a workforce capacity requirement of a retail venue for a time period, e.g. a work shift. Manager system 110 can run capacity planning process 118 until capacity planning process 118 is terminated at block 222. Manager system 110 can run preparation and maintenance process 113 and capacity planning process 118 concurrently and can run each of process 113 and process 118 iteratively.

For performance of preparation and maintenance process 113, manager system 110 can be configured to automatically process, e.g. by running of NLP process 114, messages that are generated by activities of patron users. Activities can include e.g. communication between a venue operator and patron where a patron is requested to provide assistance with a venue workload, shopping activities such as online shopping browsing sessions or in retail venue visits, purchase activities, e.g. on line or in venue, and/or survey history activities. Manager system 110 can be in communication with a variety of sources for receipt of messages generated by activities of patron users, e.g. a messaging system used for communication between patron and venue operator, venue system 140 and other in venue systems, patron user computer devices 130A-130C venue agent user computer devices 120A-120Z, one or more website hosting server of manager system 110 which can host a website for facilitation of on-line shopping, purchases, and/or surveys. Messages subject to processing can include e.g. text strings which may formatted in various file formats, e.g., webpage forms.

In one embodiment manager system 110 for performance of block 210 can instantiate structured data records in areas 1122-1125 that are adapted for use by capacity planning process 118. Manager system 110 can be configured so that manager system 110 automatically monitors for "activities" of a patron use and stores an activity record for each activity in one or more or area 1122-1125. An activity can be e.g. a communication instance where a patron user is offered an opportunity of assist with a retail venue workload. Records for such activity can be stored in area 1122. An activity can be a shopping activity e.g. a browsing session on a venue website or an in venue visit. Records for such activities can be stored in area 1122. Activities can include purchases e.g. on line or in venue. Records for such activities can be stored in area 1122. Activities can include completed surveys which can completed on line. Records for such activities can be stored in area 1123. A record for an activity prepared by manager system can include e.g. a Patron ID, ID=001, and classification information returned by subjecting a message generated by performance of the activity to NLP processing by running of NLP process 114, e.g. topic and/or sentiment classifications of generated messages. Data repository 112 can store such activity records in addition to or in place of underlying unstructured message content. In one embodiment, data repository 112 can be configured to initialize responsively to being populated with a threshold amount of data having specified attributes.

Capacity planning process 118 can establish a workload capacity requirement of a retail venue based on a variety of factors e.g. a seasonal factor, a weather factor, an events factor, a promotions factor, and/or a patron behavior factor. Data repository 112 can store historical information on a behavior of a variety of patrons e.g. patron 001, patron 002, and a plurality of additional patrons. Data repository 112 can also store results data in results area 1126. Results area 1126 can store results associated with performing workload capacity management using processes as set forth herein. In one embodiment machine learning process 117 can use data stored in results area 1126 as an input for updating in a feedback loop, sub-processes performed by capacity planning process 118.

In area 1121 a plurality of different classifications of patron behavior history data can be stored. For example, patron behavior data can include workload assistance history stored in workload assistance history area 1122, shopping history stored in shopping history area 1123, purchase history stored in purchase history area 1124, and survey history stored in survey history area 1125. The areas 1122-1125 can refer to logical separations of data and/or to different physical storage areas.

Workload assistance history data, stored in area 1122 can include a record of instances in which a patron has been offered an opportunity to assist with a workload task or retail venue in the outcome of such offerings e.g. whether the patron accepted the offer or declined the offer. In area 1122, there can be stores records of communications to patron from a venue operator e.g. wherein the operator offers an incentive to a patron in exchange for the patron providing assistance with a venue workload task. A patron can be offered an opportunity to provide assistance e.g. with one or more of a "pick," a "pack," or "place". A "pick" can include picking an article off of a retail venue store shelf. A "pack" can include packing an article in a shipping box. A "place" can include placing an article on a transportation vehicle and/or other activity to ship an article.

Shopping history data stored in area 1123 can include a record of a patron's shopping behavior e.g. data on whether the patron tends to shop online or in retail venues and time periods associated with online or in-store shopping. For example, in shopping history area 1123 there can be stored data records indicating the average time which a patron maintains an online browsing session and/or data records indicating the average length of time that a patron remains in a retail venue after arrival at a retail venue.

Data of purchase history area 1124 can include a record of purchase that the patron has made over time and include various sub-classifications relating e.g. to cost and types of products or services purchased. In purchase history area 1124, there can be store records of on-line and in venue purchases of a patron.

In area 1125 there can be stored survey history data e.g. can store records of surveys that have been completed in the past by the patron over time regarding preferences of the patron e.g. likes and dislikes.

In one embodiment manager system 110 can be operative to activate a capacity planning process 118. In one embodiment capacity planning process 118 can establish a workload capacity requirement for a retail venue based on a function of weighted factors. For example, a function of weighted factors as set forth in Equation 1. Equation 1 is as follows.

$$C=W1F1+W2F2+W3F3+W4F4 \qquad \text{(Equation 1)}$$

Where "C" is the established workload requirement for retail venue, where "F1" is a factor based on the shopping season e.g. winter, spring, summer, fall, holiday, "F2" is a factor based on weather information e.g. it can be predicted that the under particularly severe weather, patrons may remain home and under particularly fair weather conditions patrons may elect to partake in activities other than retail shopping. "F3" is a factor based on event data as may be determined by processing data from newsfeed system 160, e.g. according to factor "F3" it can be determined that e.g. a traffic pattern event or entertainment event will reduce or increase visitors to a retail venue. "F4" is a promotions factor e.g. it can be predicted that as an entity operating venue 144 launches a promotion additional patrons may be attracted into the retail venue.

Embodiments herein recognize that establishing a workload capacity requirement according to Equation 1 may not result in optimization of resources under certain conditions. For example, embodiments herein recognize that retail venue patrons, in some instances, may be able to assist with workload tasks which activity, if not accounted for, can result in un-optimized resourcing. Embodiments herein recognize that online retailers with physical brick-and-mortar stores now offer flexible fulfillment to their patrons in order to increase foot traffic to their physical stores as well as providing better patron experiences. These are flexible fulfillment methods such as buy online pickup in store, buy online ship from store, and buy online return in store. Embodiments herein recognize that with more and more consumers utilizing these flexible fulfillment options offered by the retailers, the store traffic can be very volatile and fluctuates from time to time. Embodiment herein recognize that increased store traffic resulting from flexible fulfillment options has become a major issue for the store managers as they need to be able to staff their stores more accurately to deal with the fluctuations in store foot traffic. Embodiments herein recognize that handling these fluctuations, store managers tend to be more conservative when setting up the store capacity in the planning system—erring on the side of retaining more manpower to cater to patrons in store, than those available to fulfil online orders. Capacity, in the context set forth herein refers to the human resource who are available to help with in-store order processing (pick, pack or ship). In general, the available to promise is based on both inventory availability and capacity availability. Sometimes, even if the store has enough inventory to fulfill the order, it may lack human capacity to be able to fulfill orders, thus reducing the overall count of orders that can be accepted by the retail venue store.

Accordingly, in one embodiment, manager system 110 can be operative to establish a workload capacity requirement for a retail venue according to a function of weighted factors as set forth in Equation 2. Equation 2 is as follows.

$$C=W1F1+W2F2+W3F3+W4F4+W5F5 \qquad \text{(Equation 2)}$$

Where "C" is the established workload requirement for retail venue, where "F1-F4" are as indicated in Equation 1, and where "F5" is a patron behavior factor as set forth herein, and where "W1-W5" are weights associated with the various factors. For determining patron behavior factor, manager system 110 can determine the probability of a patron of a retail venue assisting with performance of retail venue work tasks e.g. patrons who might be willing to help with picking up products for store pick-up orders or ship-to-home orders in exchange for some reward or coupon.

Embodiments set forth herein recognize that store managers rely on store labor capacity planning system to plan and manage their staffs. The capacity planning process typically relying on the forecasted demands in the store (online orders for store pickup or ship from store). There are set forth herein embodiments to extend store labor capacity planning logic beyond the traditional capacity planning logic by also leveraging the labor of the store patrons in the physical store, who might be willing to help with picking up products for store pickup orders or ship to home orders in exchange for some rewards or coupons. The optimized capacity planning component can be based on the historical physical store traffic pattern combined with a new factor to get a new value called extended capacity. From planning perspective, the new capacity C=Original planned Capacity+extended Capacity. Manager system 110 can be configured to that after rounds of execution against planning, manager system 110 can learn to optimize the factor based on different criteria through technology like machine learning.

For establishing patron behavior factor according to Equation 2, manager system 110 can perform various actions e.g. can determine a count value of patrons presently in the retail venue 144, can use that value and in one embodiment other data to predict a count of patrons in a venue during a scheduled work shift, and can also determine the probability that those patrons predicted to be within retail venue 144 during a work shift providing assistance with retail venue workload tasks e.g. assisting with pick-up of products for store pick-up orders or ship-to-home orders in exchange for some reward or coupon. In one embodiment, for determining the count of patrons currently within retail venue 144 manager system 110 can run presence process 115 to monitor data obtained by venue system 140 using one or more wireless communication connection devices 142 which can be configured as an IEEE 802.11 access point. Venue system 140 can include person count technology which permits and facilitates that determining of a count of persons including patrons in a venue by processing radio signals received by wireless communication connection devices 142 which can be configured as an IEEE access point. For determining a probability of those patrons in venue 144 assisting with a workload task manager system 110 can perform a weighted function analysis e.g. according to a function as set forth herein in Equation 3. Equation 3 is as follows.

$$P=W1CBF1+W2CBF2+W3CBF3+W4CBF4 \qquad \text{(Equation 3)}$$

Where "P" is the probability of a particular patron providing workload task assistance, "CBF1" is the probability of the patron providing assistance according to a first factor, "CBF2" is the probability of the patron providing assistance according to a second factor, "CBF3" is the probability of the patron providing assistance according to a third factor, and "CBF4" is the probability of the patron providing assistance according to a fourth factor, and where "W1-W4" are weights according to the various factors. In one embodiment, "CBF1" refers to a factor based on workload assistance history data of area 1122, "CBF2" refers to a factor based on shopping history data of shopping history area 1123, "CBF3" refers to a factor based on purchase history data of purchase history area 1124, and "CBF4" refers to a factor based on survey history data of survey history area 1125 of patron behavior area 1121 of data repository 112.

Referring to FIG. 3, there is set forth a method 300 that can be performed in one embodiment by manager system 110. At block 310 manager system 110 can perform obtaining information specifying a count of patrons currently at a venue and determining a probability that at least one patron included in the count of patrons will perform at least a portion of a venue work task. At block 320 manager system 110 can perform establishing a workload capacity requirement for maintaining operation of the venue, the establishing based on the count of patrons and the probability that the at least one patron included in the count of patrons will perform at least a portion of the venue work task. At block 330 manager system 110 can perform sending notifications to a plurality of computer devices in the venue based on the establishing, wherein the sending includes (i) sending a venue agent adapted notification to a computer device of one or more venue agent of the venue, and (ii) sending one or more patron adapted notification to a computer device of one or more patron of the venue.

Figure 4:
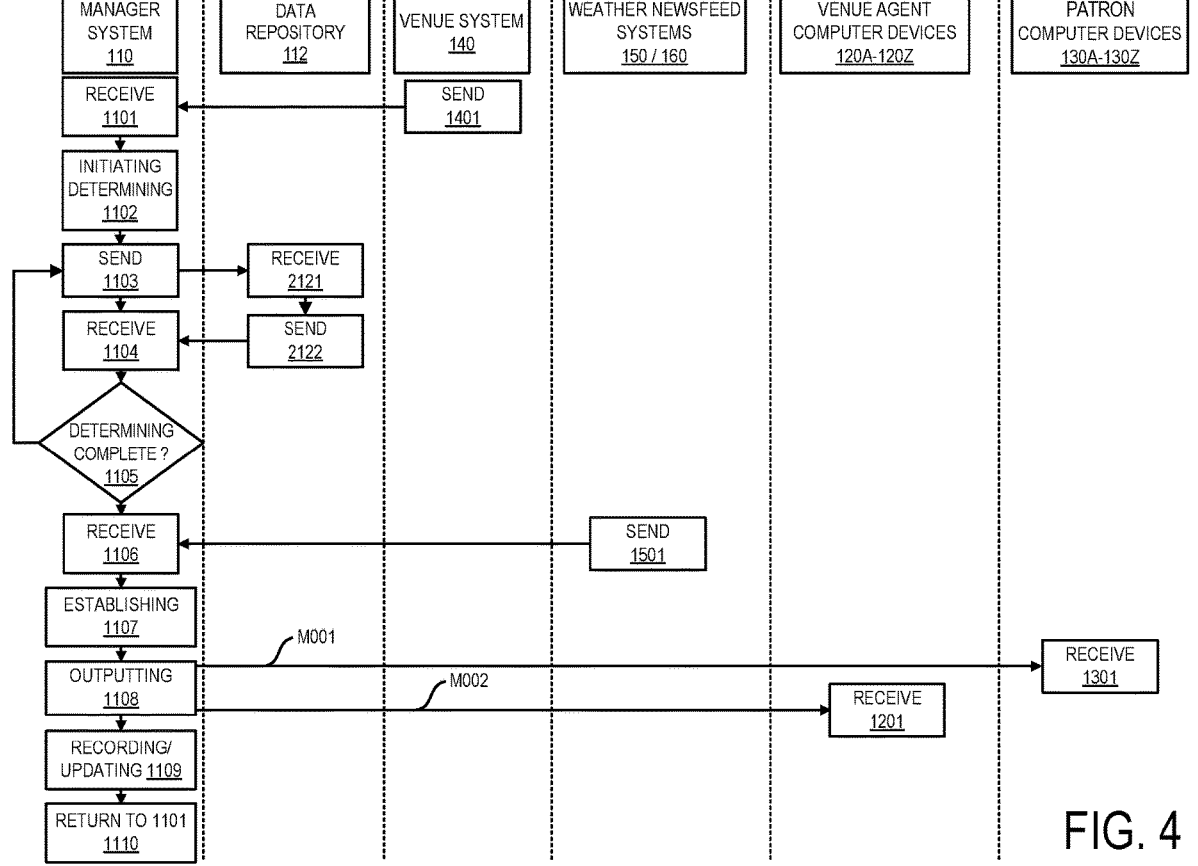
FIG. 4 depicts a flowchart illustrating a method for providing a notification according to one embodiment.

Additional aspects are set forth in reference to FIG. 4 which describes a method illustrating performance of method 300 as set forth in FIG. 3 in one embodiment. From the perspective of manager system 110 and its associated data repository 112, venue system 140, weather service and newsfeed systems 150 and 160, venue agent user computer devices 120A-120Z, and patron computer devices 130A-13Z.

At block 1401 venue system 140 can send data to manager system 110 which is received by manager system 110 at block 1101 which specifies a count of patrons currently in retail venue 144. Venue system 140 can determine the count of patrons in retail venue 144 by processing radio signals received by wireless communication connection devices 142 (FIG. 1). According to one example patron counting services can be provided by GLOBAL TECHNOLOGY SERVICES® of International Business Machines Corporation based on the IBM PRESENCE INSIGHTS™ locating services platform. Manager system 110 can predict a count of patrons in a venue during a work shift based on the count of patrons specified by received data received at block 1101. On receipt of the count data at block 1101 manager system 110 can initiate a determining at block 1102 for determining the probability that patrons of the venue patrons determined to be at the venue will assist in the performance of workforce tasks for operation of the retail venue 144 during a work shift, as indicated by send block 1103 of manager system 110, receive block 2121 of data repository 112, send block 2122 of data repository 112, and receive block 1104 of manager system 110. On receiving data at block 1101 specifying a count of patrons manager system 110 can receive data that specifies identifiers for in venue patrons so that data for the various patrons can be looked up from repository 112 and further so that such patron can be sent notifications.

Manager system 110 can make various requests of data repository 112 in the performance of the determining. For example, for each patron determined to be in the venue, manager system 110 can determine the patron's probability of assisting based on workload assistance history data of area 1122, shopping history data of area 1123, purchase history data of area 1124, and/or survey history data of area 1125.

Manager system 110 can flag patrons for whom the probability of assisting value is above a threshold as candidate patrons to receive a notification. In one embodiment, manager system 110 can determine an overall likelihood of currently present patrons assisting based on cumulative probabilities of each patron participating and assisting in the workforce operations of the retail venue 144.

At block 1105 manager system 110 can determine that determining is complete and can proceed to block 1106 to receive data that has been stored and buffered on receipt that has been sent at block 1501 from various external systems such as weather service system 150 and newsfeed system 160.

At block 1107 manager system 110 can perform establishing of a workload capacity requirement for maintaining operation of the retail venue based on the count of venue patrons currently at the venue and the probability of patrons at the venue assisting with performance of workforce tasks as determined at blocks 1102-1105. The establishing at block 1107 can include using the establishing function as set forth in Equation 2 based on multiple factors including a seasonal factor, a weather factor, an event factor, a promotions factor, and a patron factor as determined at determining blocks 1102-1105 in one embodiment. In one embodiment the count of in venue patrons specified by received data at block 1101 can provide a predicted count of patrons within a venue during a time shift for which a current workload capacity requirement determination is made. In some embodiments a predicting of a count of patrons during a time shift can be augmented with additional data. For example, at block 1101 manager system 110 can receive data from venue system data indicating a count of persons en route to a venue who will have arrived at a venue at the work shift being staffed as well as identifiers for such patrons so that data for such patrons can be looked up from repository 112 and further so that such patrons can be sent notifications. Computer devices 130A-130Z can be continuously reporting for receipt by venue system 140 GPS data specifying their location e.g. via a cellular network incorporated as part of network 170 when in transit to a venue.

At block 1108 manager system 110 can run notification process 116 to send notifications based on the establishing. For example, if the establishing at block 1107 indicates that certain in-venue patrons are able to assist with workforce tasks and predicts capacity level based on such patron's assistance, manager system 110 at block 1108 can send notifications to patrons of the in venue patrons. At block 1108 manager system 110 can selectively output notifications to a subset of patrons i.e. can output notifications to some patrons but not other patrons. To determine which of the in-venue patrons will receive at block 1301 notifications output at block 1108, manager system 110 can reference the candidate patron list qualified to receive notifications provided during the determining at blocks 1102-1105 and in one embodiment can send a count of notifications based on the count of assisting patrons established for satisfying workload requirements. Manager system 110 at block 1108 in one embodiment can send notifications to a subset of patrons, e.g. in venue patrons according to a priority that is based on the patrons determined probability of providing assistance as determined at blocks 1102-1105. For example, for outputting three notifications the outputting can be provided to the patrons determined to be the first, second, and third ranked patrons determined most likely to provide assistance with in venue workload task. At block 1108 manager system 110 can also output notifications to venue agents for receipt by venue agents at block 1201. For example, if at block 1102-1105 manager system 110 determines that numerous patrons who assist manager system 110 by performance of the establishing at block 1107 can establish that fewer than the scheduled count of venue agents are needed to satisfy the workload requirement established at block 1107 and accordingly can at block 1108 output notifications to venue agents or a subset of venue agents requiring or requesting that the venue agents not appear for work at the relevant time during a scheduling period. A social media system having a messaging system can be a social website such as FACEBOOK® (Facebook is a registered trademark of Facebook, Inc.), TWITTER® (Twitter is a registered trademark of Twitter, Inc.), LINKE-DIN® (LinkedIn is a registered trademark of LinkedIn Corporation), or INSTAGRAM® (Instagram is a registered trademark of Instagram, LLC).

Messages M001 sent to select patrons at block 1108 can be differentiated from messages M002 sent to venue agents or a subset of venue agents at block 1108. For example, messages M001 can offer incentives to patrons not offered to venue agents with messages M002, patron incentives can include e.g. rewards and/or coupons. Notifications including messages M002 sent to venue agents can include subject matter not included in messages M001 e.g. can include work schedule information and modifications as required. Messages M001 can include specific directions as to tasks not included in messages M002 given that patrons may have less familiarity with venue tasks.

In one embodiment at blocks 1103-1107 manager system 110 can perform determining a probability of each patron in a set of in venue patrons assisting in preforming a venue workload and can output notifications to select ones of the patrons (e.g. for N notifications the N patrons determined most likely to assist). In another embodiment manager system 110 can reference a set of patrons for outputting of notifications at block 1108 that is independent of the set of patrons subject to probability determining at blocks 1103-1105. Logically separating a patron list for probability determining and a patron list for outputting of notifications can improve reliability of system 100 and can reduce computational overhead. Manager system 110 can perform processing at blocks 1102-1107 for determining a number of patrons required to provide assistance but patrons receiving notification at block 1301 can include patrons other than patrons having data subject to processing at blocks 1102-1105. In one embodiment for example, manager system 110 can perform processing at block 1102-1107 for determining a number of patrons required to provide assistance based on a sample of patrons in a venue and not all patrons of the venue who are available to provide workload assistance responsively to receipt of a notification. At block 1108 in one embodiment, manager system 110 can output notifications to patrons according to a priority based on a particular location of the patron in the venue (e.g. proximate a location where assistance is to be performed) and based on the patron having probability of the patron providing assistance.

At block 1109 manager system 110 can record results of a workforce scheduling using venue agents and patrons and can update capacity planning process 118 based on the results. Scheduling results can be stored in area 1126 of data repository 112. Because results of a workforce scheduling may not be known until a time after a scheduling, recording and updating at block 1109 may pertain to results from a prior scheduling earlier in time. Monitoring for results of a scheduling can include e.g. monitoring for time at a retail venue for checkout or other patron service stations throughout the venue with delays being flagged as being indicative of un-optimized scheduling, and absence of delays being recorded as a successful scheduling. For updating at block 1109 manager system 110 can activate machine learning process 117 to perform machine learning processing. For example, manager system 110 in weight list profiles area 1127 of results area 1126 can store profile lists which can be lists of weights according to Equation 2 and Equation 3 that produced positive scheduling results and/or can store profile lists which can be lists of weights according to Equation 2 and Equation 3 that produced negative scheduling results. In one embodiment manager system 110 can be dynamically varying weights associated with Equations 2 and Equation 3 during the performance of blocks 1102-1105 and block 1107 to record the weight lists producing positive scheduling results in a positive profile list and the weight lists producing negative scheduling results in a negative profile list. Over time according to the machine learning process 117 manager system 110 can bias weight profiles in favor of weight profiles producing positive scheduling results and divergent from weight profiles producing negative scheduling results.

In another aspect machine learning process 117 can be run to correlate determined probabilities of venue patrons determined at block 1105 with one or more other data item e.g. venue patron count data, time of data, seasonal data, weather data as determined from weather service system 150 and/or demographic data of the venue as determined from newsfeed system 160, and manager system 110 can identify relationships between patron assistance probabilities and such one or more other data item. In such manner after training iterations are completed to provide training data manager system 110 at blocks 1102-1105 need not perform a determining a probability of venue patron assisting by currently examining data of ones of the current venue patrons, but rather for performing determining at block 1102-1105 can predict a probability of patron providing assistance based on one or more data item correlated with the probability of a patron providing assistance, e.g., a venue patron count data item, a time of day data item, a seasonal data item, a weather data item as determined from weather service system 150 and/or a demographic data item of the venue as determined from newsfeed system 160. Machine learning processes run by machine learning process 117 as set forth herein can improve reliability of system 100 and can reduce computational overhead. System 100 can be operative to automatically and dynamically switch between determining a probability of patrons providing assistance based on current patron data and determining by predicting, the predicting independent if current patron data. For example, manager system 110 can be configured to dynamically switch from a current patron data determining mode that uses current patron data for determining to a predicting mode based on sensed computational processing loading of venue system 140 exceeding a threshold. Manager system 110 can dynamically switch from a predicting mode to a current patron data determining mode e.g. based on a threshold percentage of users receiving help request notifications declining to provide assistance, indicating that a factor may be present affecting the predictive model that is currently not encompassed within the predictive model.

At block 1110 manager system 110 can return to block 1101 to perform a next generation of determining (blocks 1102-1105), receiving (block 1106), establishing (block 1107), outputting (block 1108), and recording and updating (block 1109).

There is set forth herein in one embodiment a system and method to leverage store patron's workforce capacity for store pickup. The system can leverage in retail venue store patrons in a physical retail venue to do some of the work for the store associate like picking up products for store pickup orders or ship to home orders. In exchange in one embodiment, store patrons can receive rewards or coupons for their help with picking up the products for the store associates.

In one embodiment system 100 can capture the count of people who were in the store or particular department in the store during a specific period of time. Additionally, system 100 can capture information regarding the store patrons who accepted the offer to help with picking up products in a retail venue for online orders. These items of information can be used by the system 100 to calculate the percentage of in-store patrons who are willing to help the store workforce for an incentive at a specific period of time.

Embodiments herein recognize that traditional capacity planning systems typically rely on the forecasted demands in the store. This includes past sales for in-store purchase orders as well as online orders for store pickup or ship from a retail venue.

In one embodiment capacity planning performed by manager system 110 can factor in specific skill sets required in performing specific jobs/tasks. For example, store associate venue agents who deal with in retail venue purchase orders may not be the same venue agents dealing with store associates who pick up the online orders for in retail venue pickup or ship from a retail venue.

Additional aspects of system 100 are set forth in reference to Example 1 and Example 2 herein that set forth possible use cases for illustration of use cases.

Example 1

If the count of forecasted online orders to be picked up in a retail venue is 100 orders and the average online orders that a store associate can pick and prepared for that time period is 20. According to one embodiment manager system 110 can suggest the store manager to staff 5 people (100 orders/20 orders per person) to perform the task of picking up products for the order orders.

With advanced functionality set forth herein manager system 110 can use capacity planning logic to incorporate the percentage of in retail venue patrons who are willing to help the store workforce for an incentive into the logic. Manager system 110 according to method 300 can employ capacity planning logic can provide improved resourcing according to Equation 4 hereinbelow.

$$N=(Of-Op)/Na \qquad \text{(Equation 4)}$$

Where N is the count of required store associates for processing online orders for in-store pickup, wherein Of is the count of orders received for in venue pickup, and Op is the predicted count of orders can be picked up by in-store store patrons, and Na is the predicted average count of pickup orders a retail venue agent can perform. Op, the total count of orders can be picked up by in venue store patron can be computed as $$Op=Cv \times Cp \times Ca \qquad \text{(Equation 5)}$$

Where Cv is the predicted count of in-venue patrons, where Cp is the percentage of in venue patrons predicted tpo provide assistance and Ca the predicted average count of orders an in venue store patron can pick

End of Example 1

Example 2

Based on Example 1, if the predicted in venue store patron for a certain time period is 50 people, the percentage of the in-store store patrons who are willing to help the store workforce is 20% and the count of average orders an in-store store patron can pick is 2 orders, the total count of orders can be picked up by in-store store patrons can be determined according to Eq. 5 as. Op=50 people*20%*2=20 orders.

Therefore, the new logic of computing the count of required retail venue agents for processing online orders for in-store pickup will be according to Eq. 4 as N=(100 orders-20 orders)/20 orders per person=4 people, whereas without advanced analytics processing as set forth herein, 5 retail venue agents might be sourced. The additional venue agent can tasked with a new task.

End of Example 2

Certain embodiments herein may offer various technical computing advantages, involving computing advantages to address problems arising in the realm of computer networks such as involving data input functionality. Embodiments herein feature improved data input functionality wherein radio signals are processed to count users at a venue, and to process user count information as crowdsourced data to trigger a plurality of artificial intelligence processes. In one embodiment radio signals from a plurality of computer devices can be processed for counting of users in a venue, and responsively trigger multiple queries into an auto-populated data repository being iteratively updated. Embodiments herein can provide automated computerized data output functionality for output notifications based on artificial intelligence processing. By arrangement of processes in a technical computing environment artificial intelligence functions can be provided that provide results beyond the limits achievable by human cognitive ability such as platforms that automatically perform natural language processing to classify data for instantaneous processing. Certain embodiments herein may offer various technical computing advantages, involving computing advantages to address problems arising in the realm of computer networks such as involving computer network to user interfacing wherein inaccurate information or misalignment with a user's attention state can yield user disengagement and wasted and unnecessary computing resource expenditures. Embodiments herein recognize that interactions between a computer network and a user of the computer network are fundamental to the operation of the computer network. For example if information presented to a user is inaccurate or misaligned to a user's state of attention, the user can disengage from the network leading to a range of problems. Computing resources will be allocated to providing functions not utilized to deliriously effect efficiencies of other services provided. Computing resources may be unnecessarily allocated to facilitate an unnecessary session termination process and additional computing resources to facilitate an unnecessary re-login process and an unnecessary re-authentication process. Embodiments herein recognize that a user interfacing with a computer network can be expected to disengage if presented with information that is inaccurate or misaligned to a current state of attention of a user. Embodiments herein can provide results and advantages that are not possible or practical without use of components of a technical computing environment, such as systematically automatically and in real time evaluating data from a plurality of data sources, some of which can include records of user behavior over time. Embodiments herein can include artificial intelligence processing platforms featuring improved processes to transform unstructured data into structured form permitting computer based analytics and predictive decision making. Embodiments herein also can include machine learning platforms that leverage historical data for improved predictive analytics. Machine learning platforms can improve accuracy of artificial intelligence decision making while reducing reliance on rules based criteria for processing. Machine learning platforms as set forth herein can accordingly increase accuracy while reducing processing complexity and computational overhead. Embodiment herein recognize that a variety of a variety of problems arise in the realm of computer networks operating in an area occupied by a plurality of users capable of communicating with a network. Embodiments herein recognize that on the occurrence of events commonly experienced by multiple users at a common time, the multiple users may make concurrent demands on the network to overload the network and frustrate the function of relied on services. Embodiments herein recognize that on outputting of notifications by the network to multiple users traffic flow patterns can be affected in significant ways giving rise to health risks, safety risks, and infrastructure building layout designed concerns. Embodiments herein can feature intelligent management of notification to users for reduction of risks associated with concurrent demands for network utilization by multiple users and traffic flow to from and within a venue.

Figure 5:
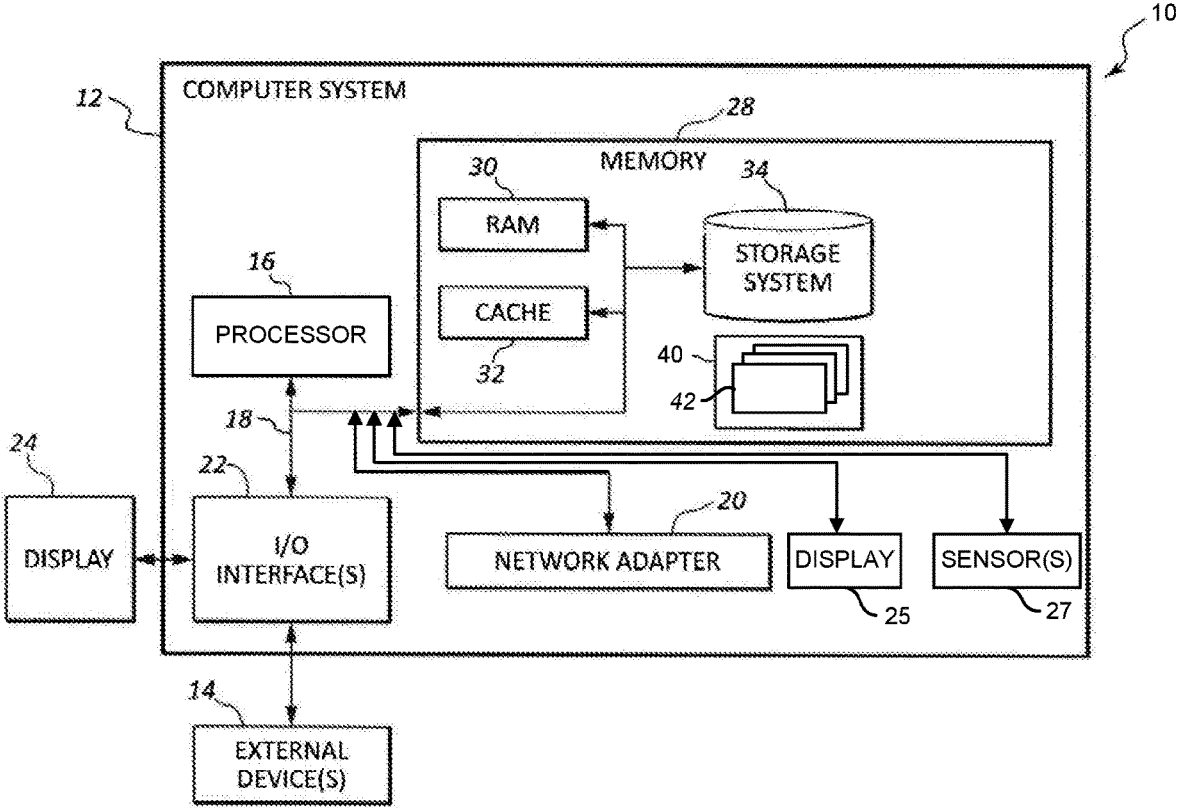
FIG. 5 depicts a computing node according to one embodiment.
Figure 6:
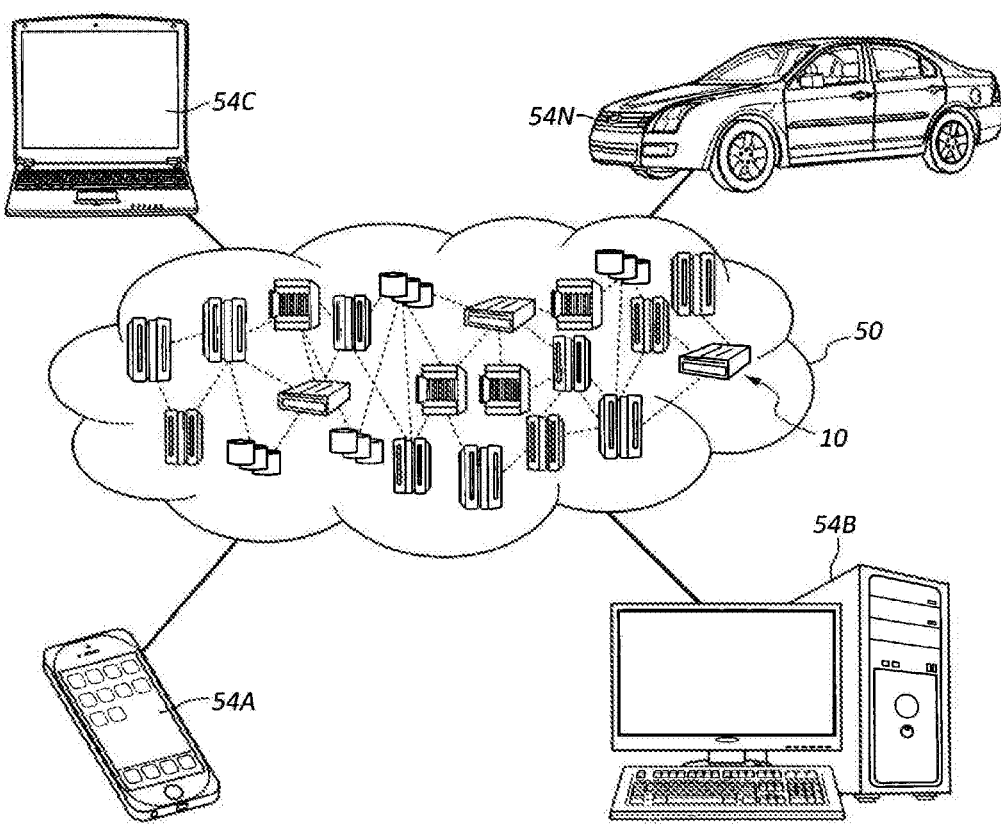
FIG. 6 depicts a cloud computing environment according to one embodiment.
Figure 7:
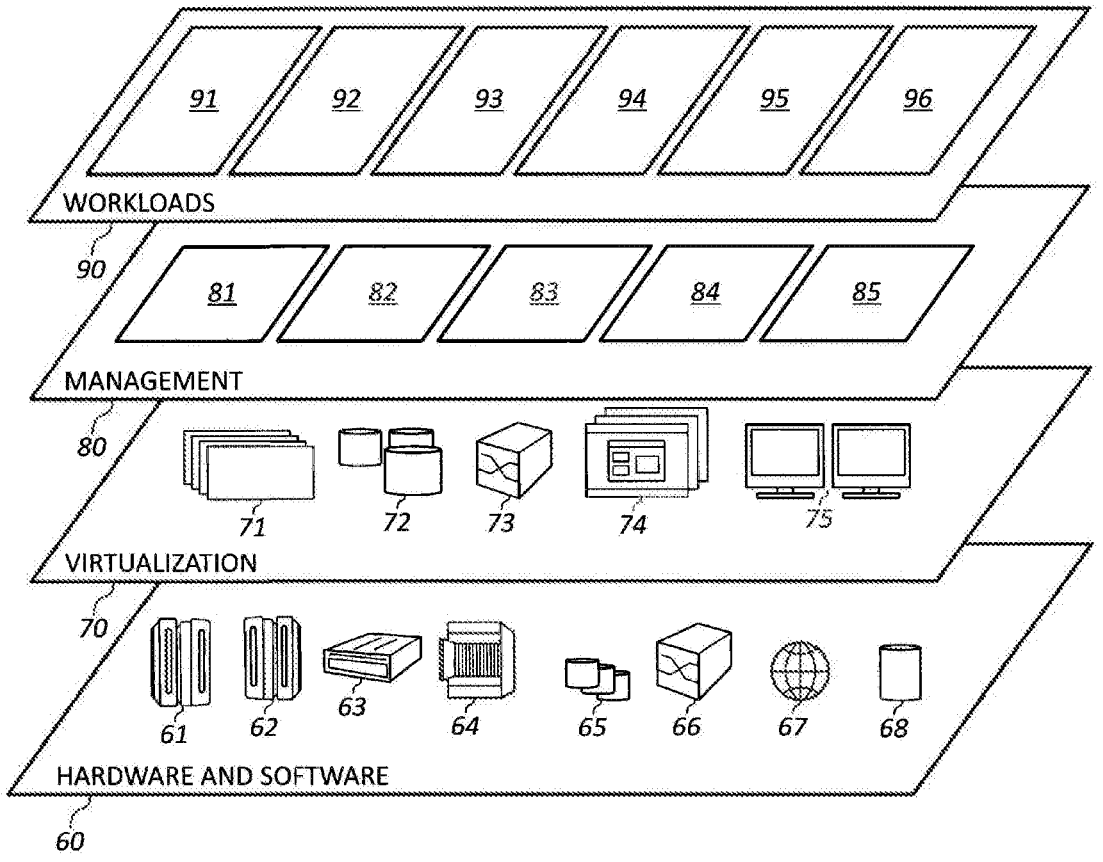
FIG. 7 depicts abstraction model layers according to one embodiment.

FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 6-7.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2, and the functions described with reference to method 300 of FIG. 3, and the functions described with reference to manager system 110 as set forth in the flowchart of FIG. 4. In one embodiment, data repository 112 can include one or more computing node 10 and can include one or more program 40 for performing functions described with reference to data repository 112 as set forth in the flowchart of FIG. 4. In one embodiment, venue system 140 can include one or more computing node 10 and can include one or more program 40 for performing functions described with reference to venue system 140 as set forth in the flowchart of FIG. 4. In one embodiment, systems 150/160 can include one or more computing node 10 and can include one or more program 40 for performing functions described with reference to systems 150/160 as set forth in the flowchart of FIG. 4. In one embodiment, one or more venue agent user computer device 120A-120Z can include one or more computing node 10 and can include one or more program 40 for performing functions described with reference to one or more user computer device 120A-120Z as set forth in the flowchart of FIG. 4. In one embodiment, one or more patron user computer device 130A-130Z can include one or more computing node 10 and can include one or more program 40 for performing functions described with reference to one or more user computer device 130A-130Z as set forth in the flowchart of FIG. 4.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 6 computing node 10 is described as being implemented in a cloud computing environment and accordingly is referred to as a cloud computing node in the context of FIG. 6.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and processing components 96 for venue capacity planning and notification as set forth herein. The processing components 96 can be implemented with use of one or more program 40 described in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain count of elements can be practiced with less than or greater than the certain count of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A system comprising:
a memory;
at least one processor in communication with the memory; and
program instructions executable by one or more processor via the memory to perform a method comprising:
iteratively processing radio signals received at a wireless communication access point for obtaining in real time a count of patrons at a venue during a work shift that terminates at a time later than a current time and discovering a probability that patrons included in the count of patrons will perform a venue work task for servicing another patron during the work shift within the venue, wherein the obtaining the count of patrons includes receiving Global Positioning System (GPS) location data from candidate patrons and ascertaining from the GPS location data that the patrons of the candidate patrons are traveling en route to the venue, and receiving from the candidate patrons with the location data patron identifiers for the candidate patrons;
iteratively and dynamically establishing in real time a workload capacity requirement for maintaining operation of the venue during the work shift, the iteratively and dynamically establishing based on the count of patrons and the probability that the patrons included in the count of patrons will perform the venue work task for servicing one or more other patron within the venue, wherein the discovering the probability that the patrons included in the count of patrons will perform the venue work task for servicing the one or more other patron includes performing information lookup using identifiers of the patron identifiers;
iteratively sending prompting notifications to a plurality of computer devices in the venue based on the iteratively and dynamically establishing the workload capacity requirement for maintaining operation of the venue during the work shift, wherein the iteratively sending includes (i) iteratively sending a venue agent adapted prompting notifications to a computer devices of one or more venue agents of the venue, and (ii) iteratively sending patron adapted prompting notifications to computer devices of certain patrons located within the venue, wherein the patron adapted prompting notifications specify aspects of the venue work task to be performed within the venue by the certain patrons for servicing the one or more other patron, and wherein the venue is of a type wherein a plurality of products are available for acquisition by visiting patrons who visit the venue, wherein a count of the venue agent prompting notifications that are iteratively sent, and a count of the patron adapted prompting notifications are dynamically varied over time and coordinated with one another for satisfaction of the iteratively and dynamically established workload capacity requirement for maintaining operation of the venue during the work shift as the established workload capacity requirement dynamically varies over time so that concurrent demands on a network supporting the venue agents and the patrons at the venue by ones of the venue agents and the patrons at the venue are reduced to reduce loading of the network and to improve functioning of the network;
wherein the discovering the probability that the patrons included in the count of patrons will perform the venue work task for servicing another patron includes a computing node based system operating in a current patron data determining mode of operation in which the computing node based system, for performance of the discovering the probability that the patrons included in the count of patrons will perform the venue work task for servicing another patron, examines current patron data of ones of current patrons currently in the venue;
sensing computational processing loading of the computing node based system;
responsively to the sensing indicating that the computational processing loading of the computing node based system has exceeded a threshold, switching operation of the computing node based system from the current patron data determining mode to a predicting mode of operation in which the computing node based system, for performance of the discovering the probability that the patrons included in the count of patrons will perform the venue work task for servicing another patron, employs use of a predictive model trained with iterations of training data without examining of current patron data of ones of current patrons currently in the venue, wherein the switching operation of the computing node based system from the current patron data determining mode to a predicting mode of operation improves functioning of the computing node based system by reducing of the computational processing loading of the computing node based system;

wherein the iteratively and dynamically establishing the workload capacity requirement for maintaining operation of the venue during the work shift includes applying a set of weighted factors, the weighted factors including a seasonal factor, a weather factor, an events factor, a promotions factor and a patron behavior factor; and monitoring results associated to the iteratively sending prompting notifications to a plurality of computer devices, and iteratively adjusting weights associated to one or more of the seasonal factor, the weather factor, the events factor, the promotions factor or the patron behavior factor in dependence on the monitoring so that accuracy of the iteratively and dynamically establishing the workload capacity requirement for maintaining operation of the venue during the work shift improves over time by machine learning while reducing computational overhead.

2. The system of claim 1, wherein the sending prompting notifications includes sending notifications according to a priority based on a predicted likelihood that patrons of the patrons currently at a venue will assist with venue workload tasks, wherein the sending notifications includes sending prompting notifications to patrons of the patrons currently at the venue according to a priority based on a location of the patrons within the venue.

3. The system of claim 1, wherein for a subsequent iteration of the establishing the workload capacity requirement for maintaining operation of the venue during the work shift, the establishing includes querying a predictive model that has been trained by machine learning with training data that includes a venue patron count data item, a time of day data item, a seasonal data item, and a weather item, wherein the querying of the predictive model, reduces computational overhead for discovering the probability that at least one patron included in the count of patrons will perform at least a portion of the venue work task with use of the information lookup.

4. The system of claim 1, wherein the venue work task includes a "pack," wherein the "pack" includes packing by a first person an article in a shipping box for delivery of the article to a second person.

5. The system of claim 1, wherein the venue work task includes one or more of the following selected from the group consisting of (a) a "pick," and wherein the "pick" includes picking by a first person an article off of a retail venue store shelf for acquisition by a second person and (b) a "place", and wherein the "place" includes placing by a first person an article on a transportation vehicle to ship an article from the venue to a second person.

6. A computer implemented method comprising:

iteratively processing radio signals received at a wireless communication access point for obtaining in real time a count of patrons at a venue during a work shift that terminates at a time later than a current time and discovering a probability that patrons included in the count of patrons will perform a venue work task for servicing another patron during the work shift within the venue, wherein the obtaining the count of patrons includes receiving Global Positioning System (GPS) location data from candidate patrons and ascertaining from the GPS location data that the patrons of the candidate patrons are traveling en route to the venue, and receiving from the candidate patrons with the location data patron identifiers for the candidate patrons;

iteratively and dynamically establishing in real time a workload capacity requirement for maintaining operation of the venue during the work shift, the iteratively and dynamically establishing based on the count of patrons and the probability that the patrons included in the count of patrons will perform the venue work task for servicing one or more other patron within the venue, wherein the discovering the probability that the patrons included in the count of patrons will perform the venue work task for servicing the one or more other patron includes performing information lookup using identifiers of the patron identifiers;

iteratively sending prompting notifications to a plurality of computer devices in the venue based on the iteratively and dynamically establishing the workload capacity requirement for maintaining operation of the venue during the work shift, wherein the iteratively sending includes (i) iteratively sending a venue agent adapted prompting notifications to a computer devices of one or more venue agents of the venue, and (ii) iteratively sending patron adapted prompting notifications to computer devices of certain patrons located within the venue, wherein the patron adapted prompting notifications specify aspects of the venue work task to be performed within the venue by the certain patrons for servicing the one or more other patron, and wherein the venue is of a type wherein a plurality of products are available for acquisition by visiting patrons who visit the venue, wherein a count of the venue agent prompting notifications that are iteratively sent, and a count of the patron adapted prompting notifications are dynamically varied over time and coordinated with one another for satisfaction of the iteratively and dynamically established workload capacity requirement for maintaining operation of the venue during the work shift as the established workload capacity requirement dynamically varies over time so that concurrent demands on a network supporting the venue agents and the patrons at the venue by ones of the venue agents and the patrons at the venue are reduced to reduce loading of the network and to improve functioning of the network;

wherein the discovering the probability that the patrons included in the count of patrons will perform the venue work task for servicing another patron includes a computing node based system operating in a current patron data determining mode of operation in which the computing node based system, for performance of the discovering the probability that the patrons included in the count of patrons will perform the venue work task for servicing another patron, examines current patron data of ones of current patrons currently in the venue;

sensing computational processing loading of the computing node based system;

responsively to the sensing indicating that the computational processing loading of the computing node based system has exceeded a threshold, switching operation of the computing node based system from the current patron data determining mode to a predicting mode of operation in which the computing node based system, for performance of the discovering the probability that the patrons included in the count of patrons will perform the venue work task for servicing another patron, employs use of a predictive model trained with iterations of training data without examining of current patron data of ones of current patrons currently in the venue, wherein the switching operation of the computing node based system from the current patron data determining mode to a predicting mode of operation improves functioning of the computing node based system by reducing of the computational processing loading of the computing node based system;

wherein the iteratively and dynamically establishing the workload capacity requirement for maintaining operation of the venue during the work shift includes applying a set of weighted factors, the weighted factors including a seasonal factor, a weather factor, an events factor, a promotions factor and a patron behavior factor; and monitoring results associated to the iteratively sending prompting notifications to a plurality of computer devices, and iteratively adjusting weights associated to one or more of the seasonal factor, the weather factor, the events factor, the promotions factor or the patron behavior factor in dependence on the monitoring so that accuracy of the iteratively and dynamically establishing the workload capacity requirement for maintaining operation of the venue during the work shift improves over time by machine learning while reducing computational overhead.

7. The computer implemented method of claim 6, wherein the sending prompting notifications includes sending notifications according to a priority based on a predicted likelihood that patrons of the patrons currently at a venue will assist with venue workload tasks, wherein the sending prompting notifications includes sending notifications to patrons of the patrons currently at the venue according to a priority based on a location of the patrons within the venue.

8. The computer implemented method of claim 6, wherein for a subsequent iteration of the establishing the workload capacity requirement for maintaining operation of the venue during the work shift, the establishing includes querying a predictive model that has been trained by machine learning with training data that includes a venue patron count data item, a time of day data item, a seasonal data item, and a weather item, wherein the querying of the predictive model, reduces computational overhead for discovering the probability that at least one patron included in the count of patrons will perform at least a portion of the venue work task with use of the information lookup.

9. The computer implemented method of claim 6, wherein the venue work task includes a "pack," wherein the "pack" includes packing by a first person an article in a shipping box for delivery of the article to a second person.

10. The computer implemented method of claim 6, wherein the venue work task includes one or more of the following selected from the group consisting of (a) a "pick," and wherein the "pick" includes picking by a first person an article off of a retail venue store shelf for acquisition by a second person and (b) a "place", and wherein the "place" includes placing by a first person an article on a transportation vehicle to ship an article from the venue to a second person.

11. A computer program product comprising:

a computer readable storage medium readable by one or more processing unit and storing instructions for execution by one or more processor for performing a method comprising: iteratively processing radio signals received at a wireless communication access point for obtaining in real time a count of patrons at a venue during a work shift that terminates at a time later than a current time and discovering a probability that patrons included in the count of patrons will perform a venue work task for servicing another patron during the work shift within the venue, wherein the obtaining the count of patrons includes receiving Global Positioning System (GPS) location data from candidate patrons and ascertaining from the GPS location data that the patrons of the candidate patrons are traveling en route to the venue, and receiving from the candidate patrons with the location data patron identifiers for the candidate patrons;

iteratively and dynamically establishing in real time a workload capacity requirement for maintaining operation of the venue during the work shift, the iteratively and dynamically establishing based on the count of patrons and the probability that the patrons included in the count of patrons will perform the venue work task for servicing one or more other patron within the venue, wherein the discovering the probability that the patrons included in the count of patrons will perform the venue work task for servicing the one or more other patron includes performing information lookup using the identifiers of the patron identifiers;

iteratively sending prompting notifications to a plurality of computer devices in the venue based on the iteratively and dynamically establishing the workload capacity requirement for maintaining operation of the venue during the work shift, wherein the iteratively sending includes (i) iteratively sending a venue agent adapted prompting notifications to a computer devices of one or more venue agents of the venue, and (ii) iteratively sending patron adapted prompting notifications to computer devices of certain patrons located within the venue, wherein the patron adapted prompting notifications specify aspects of the venue work task to be performed within the venue by the certain patrons for servicing the one or more other patron, and wherein the venue is of a type wherein a plurality of products are available for acquisition by visiting patrons who visit the venue, wherein a count of the venue agent prompting notifications that are iteratively sent, and a count of the patron adapted prompting notifications are dynamically varied over time and coordinated with one another for satisfaction of the iteratively and dynamically established workload capacity requirement for maintaining operation of the venue during the work shift as the established workload capacity requirement dynamically varies over time so that concurrent demands on a network supporting the venue agents and the patrons at the venue by ones of the venue agents and the patrons at the venue are reduced to reduce loading of the network and to improve functioning of the network;

wherein the discovering the probability that the patrons included in the count of patrons will perform the venue work task for servicing another patron includes a computing node based system operating in a current patron data determining mode of operation in which the computing node based system, for performance of the discovering the probability that the patrons included in the count of patrons will perform the venue work task for servicing another patron, examines current patron data of ones of current patrons currently in the venue;

sensing computational processing loading of the computing node based system;

responsively to the sensing indicating that the computational processing loading of the computing node based system has exceeded a threshold, switching operation of the computing node based system from the current patron data determining mode to a predicting mode of operation in which the computing node based system, for performance of the discovering the probability that the patrons included in the count of patrons will perform the venue work task for servicing another patron, employs use of a predictive model trained with iterations of training data without examining of current patron data of ones of current patrons currently in the venue, wherein the switching operation of the computing node based system from the current patron data determining mode to a predicting mode of operation improves functioning of the computing node based system by reducing of the computational processing loading of the computing node based system;

wherein the iteratively and dynamically establishing the workload capacity requirement for maintaining operation of the venue during the work shift includes applying a set of weighted factors, the weighted factors including a seasonal factor, a weather factor, an events factor, a promotions factor and a patron behavior factor; and monitoring results associated to the iteratively sending prompting notifications to a plurality of computer devices, and iteratively adjusting weights associated to one or more of the seasonal factor, the weather factor, the events factor, the promotions factor or the patron behavior factor in dependence on the monitoring so that accuracy of the iteratively and dynamically establishing the workload capacity requirement for maintaining operation of the venue during the work shift improves over time by machine learning while reducing computational overhead.

12. The computer program product of claim 11, wherein the sending prompting notifications includes sending notifications according to a priority based on a predicted likelihood that patrons of the patrons currently at a venue will assist with venue workload tasks, wherein the sending prompting notifications includes sending notifications to patrons of the patrons currently at the venue according to a priority based on a location of the patrons within the venue.

13. The computer program product of claim 11, wherein for a subsequent iteration of the establishing the workload capacity requirement for maintaining operation of the venue during the work shift, the establishing includes querying a predictive model that has been trained by machine learning with training data that includes a venue patron count data item, a time of day data item, a seasonal data item, and a weather item, wherein the querying of the predictive model, reduces computational overhead for discovering the probability that at least one patron included in the count of patrons will perform at least a portion of the venue work task with use of the information lookup.

14. The computer program product of claim 11, wherein the venue work task includes a "pack," wherein the "pack" includes packing by a first person an article in a shipping box for delivery of the article to a second person.

15. The computer program product of claim 11, wherein the venue work task includes one or more of the following selected from the group consisting of (a) a "pick," and wherein the "pick" includes picking by a first person an article off of a retail venue store shelf for acquisition by a second person and (b) a "place", and wherein the "place" includes placing by a first person an article on a transportation vehicle to ship an article from the venue to a second person.

\* \* \* \* \*